United States Patent [19]

Mori et al.

[11] 3,837,066

[45] Sept. 24, 1974

[54] METHOD OF EXTRUDING ALUMINUM COATED NB-TI

[75] Inventors: Masahiro Mori, Allentown; Walter C. Hahn, Pleasant Valley; Betzalel Avitzur, Allentown, all of Pa.

[73] Assignee: The United States of America as represented by the Atomic Energy Commission, Washington, D.C.

[22] Filed: Feb. 14, 1973

[21] Appl. No.: 332,441

[52] U.S. Cl............... 29/599, 29/187.5, 29/197, 29/DIG. 47, 72/258, 174/DIG. 6
[51] Int. Cl................ H01v 11/00, B21c 23/22
[58] Field of Search.......... 72/258; 29/187.5, 180 E, 29/197, 599, DIG. 47; 174/126 CP, DIG. 6

[56] References Cited
UNITED STATES PATENTS

| | | | |
|---|---|---|---|
| 3,514,850 | 6/1970 | Barber | 29/599 |
| 3,580,019 | 5/1971 | Borenov | 72/258 |
| 3,618,206 | 11/1971 | Gubler | 29/599 |
| 3,623,221 | 11/1971 | Morton | 29/599 |

Primary Examiner—C. W. Lanham
Assistant Examiner—Robert M. Rogers
Attorney, Agent, or Firm—John A. Horan; C. Daniel Cornish

[57] ABSTRACT

This invention provides a billet and a method for shaping the same for the production of composite superconductor wire composed of at least one high yield strength superconductor core surrounded by a low yield strength matrix material that is uniformly clad on and around and bonded to the core for use in magnets and the like. In one actual billet, which has a core to sleeve yield strength ratio of about 7–1, the billet has a core-to-sleeve diameter ratio of between about 0.4 and 0.9 and a nose cone semi-angle of 5° for extrusion through a die semi-angle of 5° for area reductions of 39 to 65 percent. This billet comprises an aluminum clad niobium-titanium core with ratios of core area to sleeve area ranging from 27.5 to 100.2 percent. The billet according to the method of this invention, is extruded without fabrication damage and/or annealing to produce a uniform bond between the superconductor core and the matrix.

4 Claims, 4 Drawing Figures

A: 0.177", 0.154", 0.116"

B: SAME AS OR LESS THAN A DIE EXIT DIAMETER

ASSEMBLED BILLET CONFIGURATION

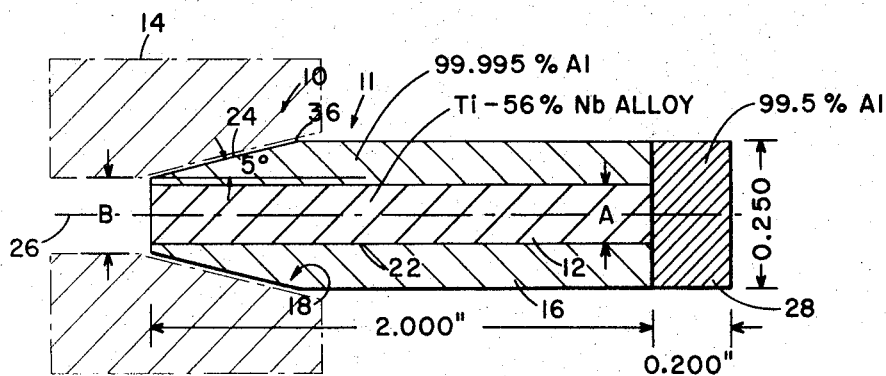
A: 0.177", 0.154", 0.116"
B: SAME AS OR LESS THAN A DIE EXIT DIAMETER
FIG. 1 ASSEMBLED BILLET CONFIGURATION
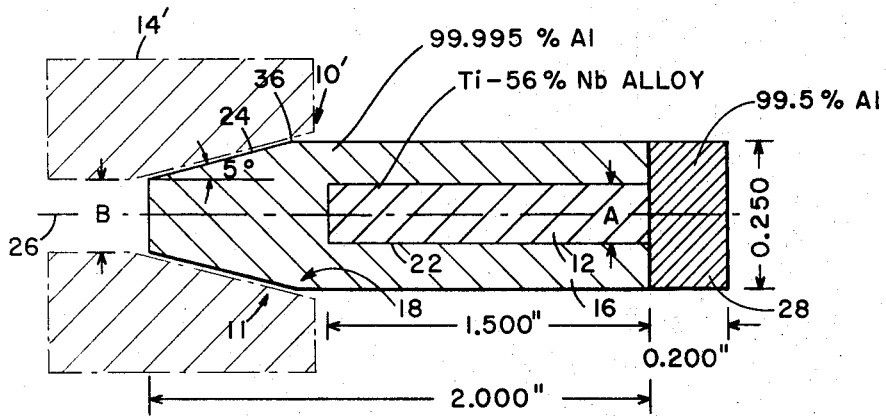
A: 0.197", 0.154", 0.116"
B: SAME AS OR LESS THAN A DIE EXIT DIAMETER
FIG. 2 ALTERNATIVE ASSEMBLED BILLET CONFIGURATION

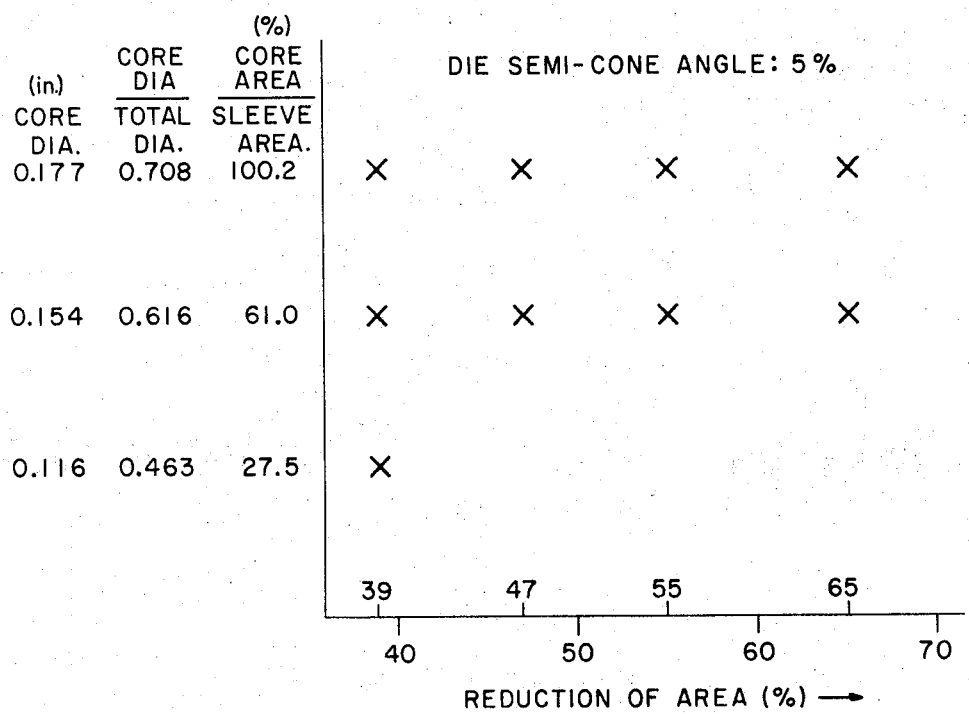
FIG. 3 SOUND REGION
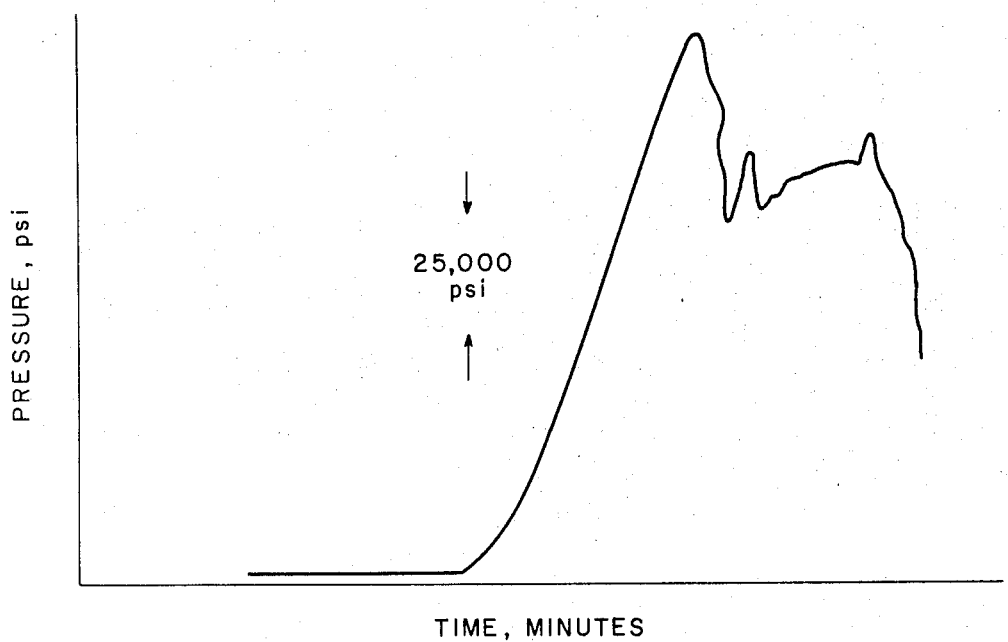
FIG. 4 RECORDED PRESSURE FOR A SUCCESSFUL EXTRUSION 3,837,066

METHOD OF EXTRUDING ALUMINUM COATED NB-TI

BACKGROUND OF THE INVENTION

This invention was made in the course of, or under a contract with the United States Atomic Energy Commission.

In the field of superconductivity, two-component composite superconductors will have many desirable and interesting uses in the field of medicine, metallurgy, mining, pollution abatement, power generation, transportation, magnetism, and physics, provided that the fabrication problem thereof can be solved. Of special interest is a two-component composite superconductor comprising a wire composed of at least one high yield strength superconductor core component surrounded by a relatively low yield strength metal matrix component. However, it has been difficult heretofore to fabricate such a composite superconductor by extrusion because of the problems involved in flowing the low yield strength component around the high yield strength component in such a way as to form a uniform bond between the two components. It would thus be advantageous to be able to extrude such components by area reduction into thin two component composite superconducting wire without fabrication damage to the components during the extrusion process.

SUMMARY OF THE INVENTION

It has been discovered in accordance with this invention that a billet having a high yield strength core and a relatively low yield strength sleeve or matrix can be extruded successfully through a variety of dies for producing a variety of cross-sectional area reductions so as to produce a composite having a uniform bond between the components thereof and without fabrication damage thereto, provided the billet has the proper core-to-sleeve ratio, and the starting billet is properly shaped relative to the die.

In one embodiment, this invention provides a method of shaping a billet composed of a core material having a yield strength of about 64,000 psi and a sleeve or matrix material having a yield strength of 9,000 psi, comprising the steps of forming a billet of said core material surrounded by said sleeve or matrix in the form of a sleeve with a core-to-sleeve diameter ratio in the range of between about 0.4 and 0.9 and a nose cone semi-angle of at least 5° and extruding said billet through a die at an angle of extrusion that is at least 5°.

In one example, this invention provides a cylindrical billet having an Al sleeve and a Nb-Ti core with a predetermined core-to-sleeve diameter ratio between about 0.4 and 0.9 and a nose cone semi angle of about 5°, and a method for shaping the billet, comprising extruding the billet through a die having a die angle at least as large as the nose cone semi-angle and a die entry diameter not in excess of the die exit diameter, so as to form a right circular cylindrical core of a niobium-titanium superconductor surrounded by a concentric cylindrical matrix of aluminum that is uniformly bonded to the core in the form of a matrix substantially without fabrication damage to the composite and/or its components. With the proper selection of billet shape, core-to-sleeve diameter ratio, and relation between the billet and die in accordance with this invention, the desired composite superconductor wire is achieved in a variety of dies with a variety of incremental core and/or sleeve area reductions. In this regard, total are reductions of up to 90 percent are provided by sequential extrusions without annealing between the increments.

It is an object of this invention, therefore to provide a billet having high yield strength core and a sleeve of material having a low yield strength relative to the core, and a simple method for extruding the same to form a superconductor wire in a uniformly bonded composite substantially without fabrication damage to the composite or its components.

The above and further novel features and objects of this invention will appear from the following detailed description when the same is read in connection with the accompanying drawings, and the novel features will be particularly pointed out in the appended claims.

BRIEF DESCRIPTION OF THE DRAWINGS

In the drawings, where like elements are referenced alike:

FIG. 1 is a partial cross-section of one embodiment of the billet of this invention for use in accordance with the method of this invention;

FIG. 2 is a partial cross-section of another embodiment of the billet of FIG. 1;

FIG. 3 is a graphic illustration of the successful process parameters for extruding the billet of this invention in accordance with the method of this invention;

FIG. 4 is a graphic illustration of the variable extrusion pressure used throughout a successful extrusion sequence of the billet of this invention in accordance with the method of this invention.

DESCRIPTION OF THE PREFERRED EMBODIMENT

This invention is useful in extruding billets having a first high yield strength core component and a low yield strength matrix component to form two component composite superconductor wire. As such this invention is particularly useful in providing a composite, comprising an aluminum matrix around one or more niobium-titanium filaments for use in magnets. Additionally, the principles of this invention are broadly useful in extruding high yield strength core components having low yield strength sleeve components for a variety of other uses as will be understood in more detail hereinafter by one skilled in the art from a reading of the following description of two embodiments of the billet of this invention for use in the extrusion bonding of the two components without fabrication damage to either component. In this regard, the principles of this invention are particularly useful in adapting superconductivity to every day life in such diverse fields as medicine, metallurgy, mining, pollution abatement, power generation and transportation since this invention provides a practical billet and fabrication method for innovating new products utilizing the breakthrough in technology provided by the use of composite superconductors.

Referring to FIG. 1, in one embodiment the two component billet 10 of this invention forms a composite 11 having a high yield strength cylindrical superconductor core component 12 of a superconducting s-material and a low yield strength cylindrical sleeve component 16 of a resistive n-material having a boundary 22 therebetween. To this end it is desirable to produce uniform and sound plastic flow and bonding at the boundary 22 between the components 12 and 16 by extrusion, but this has been difficult heretofore particularly because elongation and fracture of and void formation around the high yield strength component tended to occur to varying degrees during plastic forming, and one or both of the components have been subject to fracture during deformation.

By providing a correctly shaped low yield strength sleeve around a high yield strength core having with the sleeve the correct predetermined diameter ratio and relation to the die in accordance with this invention, the billet 10 can be extruded to provide a wire that is unexpectedly fabrication damage free, and has uniform bonding between the components. Billet 10 has at one end a shaped nose 24 with a nose cone semi angle at least 5°, as illustrated relative to the longitudinally extending axis 26 of the billet 10, and a metal cap 28 glued to the other end thereof through which the extrusion force is at least partially applied to the billet 10 to extrude the two components 12 and 16 thereof. The embodiment of FIG. 1 has a cylindrical core component 12 formed from the described superconductor s-material, and a cylindrical sleeve component 16 of n-material forming boundary 22 around the core component and co-axial therewith along the entire length of the billet 10. On the other hand, the embodiment shown in FIG. 2, similar to that shown in FIG. 1, has a core component extending longitudinally along the axis of the sleeve component only part way therein, e.g., up to the base 36 of the cone-shaped nose 24 thereof.

In the embodiments of FIGS. 1 and 2, where the billets 10 and 10' are shown in relation to dies 14 and 14' having die angles 18, the core forms the described high yield strength or hard superconductor in the shape of a right-circular, cylindrically shaped rod having the described low core-to-sleeve diameter ratio, and the described low yield strength or soft, ductile, concentric, co-axial, resistive, annular, right circular sleeve component around the core component. This provides a close fitting concentric, thin walled metal jacket around the core component before the co-extrusion of the two components of the composite 11, and a uniformly bonded matrix thereon after the co-extrusion thereof. Advantageously, the core and sleeve components are co-extruded from an initial relative large cross-sectional area and an initial predetermined small core-to-sleeve diameter ratio to produce simultaneous substantially uniform cross-sectional area reductions in both the core and the sleeve components. The aluminum cap 28, which is bonded to the billet at the opposite end thereof from the tapered nose 24 with epoxy resin transmits at least part of the extrusion force from the extrusion press to force the billet through the die to produce the area reduction thereof by extrusion.

The extruded product of this invention has high superconducting current densities and critical fields in wires of small sizes for use in large magnetic fields for fabrication into useful devices, such as magnets, etc. For example, the extruded composite produced in accordance with this invention forms a wire that is free of fabrication damage, such as fracture, which is determined by standard metallurgical techniques, such as x-ray analysis. Also, the bond across the boundary 22 has a high uniform strength. This is also determined by standard metallurgical techniques, and x-ray analysis. Additionally, one side of the boundary 22 provides an electrically resistive stabilizer in the n-material formed from the low yield strength component 16, which has a resistivity higher than the s-material on the other side of the boundary 22 at superconducting temperatures, as determined by standard tests, whereby the soft component 16 of the composite 11 acts as both an insulator and a low resistance conductor at high magnetic fields and/or current densities, which are also determined by standard test. Thus, the composite 11 of this invention is commercially useful, as shown by standard electrical tests, for AC or DC pulsing by permitting current flow temporarily to jump from the superconducting hard component 12 into and through the other component 16 at superconducting temperatures.

This latter feature involves the flux jumps described in the March 1967 Scientific American on pp. 115 et seq. Also, Cooper pairs and or tunneling may be involved, in the proximity of the interface between the two components of the composite 11 in the neighborhood of the boundary 22 at low temperatures by modification of the properties of the electrons on both sides of the boundary 22. The theory for this proximity effect was described by Cooper in 1961, Parameter in 1963, de Gennes and Guyon in 1963, and Silvert and Cooper in 1966. A more recent discussion of the theory behind this proximity effect in a two layer system, explains this effect as involving the reduction of the energy gap in the superconducting s-layer and the production of Cooper pairs of electrons having opposite and equal spins and momentum in the resistive n-layer on the other side of the boundary between the layers, as described in the "Theory of Superconductivity" by Charles G. Kuper, Clarendon Press, Oxford, England, 1968. To this end, the wire formed by this invention is cooled to temperatures below the superconducting critical temperatures of the superconducting components by conventional means, such as an insulated liquid nitrogen cryostat, and a current flow is produced from one end to the other end of the wire, such as by a battery or a flux pump, and a load at the opposite end of the wire.

In operation, it will be understood that the billet 10 is extruded through conventional dies 14 having suitable die angles 18 by conventional means, such as hydrostatic force means at conventional pressures in a standard protective ambient atmosphere, and the die and/or the product can be cooled by conventional means. The extrusion step and schedule advantageously provide, in one ambient, incremental crosssectional area reductions for producing large total cross-sectional reductions and small wire diameters from large billets.

While the core component of FIGS. 1 and 2 are niobium-titanium of a particular alloy, and the corresponding sleeve components therefor are aluminum of a high purity for use in a specific billet 10 that is extruded by specific steps for further fabrication into a multi-filament wire for use at high magnetic fields, it will be understood that other components can be used to produce the strong uniform bonding of this invention without fabrication damage to the composite produced by the method of this invention within the spirit and scope of this invention by one skilled in the art from a reading of the specification and the drawings by providing the correct core-to-sleeve ratio.

The following are examples of this invention:

EXAMPLE I

Hard Nb-44 wt. % Ti was received as nominally 178 inch diameter circular cross-section cylindrical rod with a yield strength of about 64,300 psi. Several sizes of cores were made therefrom by cold swaging this rod to 0.187 inch, 0.156 inch, or 0.125 inch diameters. These cold swaged rods were then solution heat treated at 800°C, water quenched, and machined to 0.177 inch, 0.154 inch, or 0.116 inch diameters respectively.

Soft Al (99.995 percent pure) was received as nominally ¼ inch circular cross-section cylindrical rod that had been annealed and slightly cold worked to a yield strength of about 9000 psi. A hole was drilled in this aluminum rod to form an annular sleeve having an inside diameter about 0.001 inch smaller than the outside diameter of the niobium-titanium rod, and the latter was inserted in the hole in the Al by shrink fitting to form the assembled two-component billet composite of FIG. 1, while an alternate composite used is shown in FIG. 2.

The outside of the assembly billet was rubbed with steel wool and coated with beeswax for lubrication.

Extrusion was carried out with a ½ inch bore monoblock extrusion unit using conventional dies.

Successful parameters, as shown by x-ray analysis, are shown in FIG. 3, wherein core-to-sleeve diameter ratios of between about 0.4 and 0.9 were successful.

The following core outside diameters and cross-sectional area reductions were provided by incremental co-extrusion without intermediate annealings:

O.D.

| | | | | | |
|---|---|---|---|---|---|
| .177" | Area Reductions Core Billet | 65% (red) | 52% (red) | 40% (red) | |
| .154" | | .148" | .102" | .079" | |
| | Area Reductions Core Billet | 47% (red) | 43% (red) | 45% (red) | 40% (red) |
| .154" | Core Billet | .182 | .138 | .102 | .079 |

The extrusion pressure was variable throughout a successful run as shown in FIG. 4.

Example II

The method of Example I was repeated with two-component composite billet specimens corresponding to the geometry of FIG. 1 but having the following dimensions:

Assembled-billet, core and sleeve lengths - 2.000 inches

Core — O.D. — 0.154 inch — annealed at 800°C and water cooled

Sleeve — I.D. — 0.153 inch — as received — yield strength 9,000 psi

Semi-Cone altitude (nose 24) - 0.571 inch

Five of these specimens were extruded to outside diameters of 0.157 inch at 56.4 percent reduction.

All specimens showed good boundary bonds without fabrication damage between the two layers of the two-components of composite formed, as indicated by x-ray analysis.

EXAMPLE III

The method of Example I was used with the two-component billets of FIGS. 1 and 2 to produce successful composite superconductor wires for cross-sectional area reductions without fabrication damage to the components and with a uniform bond between the components across the boundary of the co-axial layers thereof, as shown by standard metallurgical tests. At liquid nitrogen temperatures the core was superconducting at high current densities and in strong magnetic fields.

EXAMPLE IV

The method of Example I was repeated with hard and soft, two-component, composite billet specimens having core to sleeve yield strength ratios of 7 to 1, core to sleeve diameter ratios of 0.4 to 0.9, and billet and die semi-cane angles of 5° successfully to produce without damage uniformly bonded two-component superconductor wires having a high yield strength cylindrical superconductor core in a low yield strength matrix. The yield strength ratio varied during incremental area reductions produced by extrusions through decreasing diameter dies over a range of area reductions from 39 to 65 percent with ratios of core area to sleeve area ranging from 27.5 to 100.2 percent.

EXAMPLE V

The method of Example IV was repeated and several of the first extruded two component superconductor products containing the high yield strength superconductor core in a low yield strength matrix were assembled into multi-filament superconductors by assembling the products in holes drilled in a billet of the same matrix material contained in the first extruded two-component superconductor products. Then cold working caused the matrix material to form into a solid mass in which the matrix was uniformly bonded to the cores.

EXAMPLE VI

The method of Example IV was repeated and several of the first extruded two-component superconductor products were assembled in a sleeve of the same matrix material used in these first extruded two-component superconductor products. This assembly was then cold worked to form a multi-filament superconductor for use in a magnet at high magnetic fields and high current densities. Here the matrix was uniformly bonded to the multi-filament cores without fabrication damage to either the cores or the matrix.

While the above has described several examples of two-component composites, it will be understood that a plurality of these two-component composites can be assembled in a sleeve that is cold worked to form a multiplicity of multi-filamentary superconductors in a normal resistance or stabilizer matrix.

In review of the above, this invention has the advantage of dependably providing a uniform bond between the high yield strength superconductor and a low yield strength matrix material by extruding the same through a wide variety of die sizes to produce a large incremental and total cross-sectional area reduction in a composite superconductor wire.

For purposes of this invention, by low or lower yield strength is meant, lower than the high or higher yield strength material. In the case of the described low yield strength sleeve, which is metal, the yield strength thereof is down to about 9,000 psi, and the high yield strength core is up to about 64,000 psi.

What is claimed is:

1. The method of shaping in a die having an entry and an exit a composite superconductor composed of a niobium-titanium core material surrounded by a matrix material of aluminum having a lower yield strength that said core material, comprising the steps of:
   a. cold swaging a rod of Nb-44 wt. % Ti core material,
   b. heating the rod to 800°C;
   c. water quenching the rod;
   d. machining the rod to a diameter of between 0.177 inch and 0.116 inch;
   e. forming a billet of said Nb-44 wt. % Ti machined rod so that said core material is surrounded by a single, one-component, 99.995 percent pure, uncanned and unlayered sleeve of said matrix material in which the core-to-sleeve diameter ratio is in the range of between about 0.4 and 0.9 and whose die entry end has a nose cone semiangle of at least 5° and a diameter not in excess of the die exit diameter, and
   f. extruding said billet through a die at an angle of extrusion which is at least 5° to form a composite superconductor wire,
   the yield strength ratio of said core-to-matrix material in said billet being between about 7 and 1 and the core material having a yield strength of up to about 64,300 psi, and
   the incremental cross-sectional area reduction during said extruding step being between about 39 and 65 percent.

2. The method of claim 1 in which before said extruding step the outside of said matrix material is smoothed and coated with a lubricant, and thereafter the extruding step is carried out sequentially in increments for providing a 90 percent total cross-sectional area reduction that forms a composite superconductor wire substantially without fabrication damage and with a uniform bond between said components at extrusion pressures of at least 25,000 psi without annealings between said increments.

3. The method of claim 1 in which said extruding step is performed according to a schedule for the incremental reduction in the cross-sectional area of said components, comprising an initial 47 to 65 percent cross-sectional area reduction, and at least one subsequent cross-sectional area reduction of between about 40 and 50 percent for achieving a total final cross-sectional area reduction of at least 90 percent in said components from their initial cross-section area in said billet.

4. A billet for producing a composite superconductor wire by extrusion, comprising:
   a. first means forming a right circular cylinder of Ti-56 percent Nb alloy in the shape of a rod having a longitudinal axis and an outside diameter of at least 0.116 inches;
   b. second means forming an annular, right circular, uniform diameter, Al sleeve around and concentric with said first means and having a longitudinally extending axis corresponding with the axis of said first means;
   said second means having a first end tapered in a semi-cone angle of 5° from the longitudinally extending axis thereof for insertion into a die for the co-extrusion of said first and second means, and
   c. Al cap means bonded with epoxy resin to the opposite end of said second means from said first end that is tapered;
   said first and second means having an initial first-to-second means diameter ratio between about 0.4 and 0.9 for preventing fabrication damage and providing plastic flow and a uniformly strong bond between said first and second means during extrusion of the same at high pressures to produce a composite superconductor wire therefrom.

* * * * *